United States Patent
Sexton et al.

(10) Patent No.: US 7,080,382 B2
(45) Date of Patent: Jul. 18, 2006

(54) ACCESSING SHORTER-DURATION INSTANCES OF ACTIVATABLE OBJECTS BASED ON OBJECT REFERENCES STORED IN LONGER-DURATION MEMORY

(75) Inventors: Harlan Sexton, Palo Alto, CA (US); David Unietis, Menlo Park, CA (US); Mark Jungerman, San Francisco, CA (US); Peter Benson, Boulder, UT (US)

(73) Assignee: Oracle International Corporation, Redwood Shores, CA (US)

( * ) Notice: Subject to any disclaimer, the term of this patent is extended or adjusted under 35 U.S.C. 154(b) by 831 days.

(21) Appl. No.: 09/768,823

(22) Filed: Jan. 25, 2001

(65) Prior Publication Data

US 2001/0047436 A1 Nov. 29, 2001

Related U.S. Application Data

(60) Provisional application No. 60/185,137, filed on Feb. 25, 2000.

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl. .................................. 719/315; 717/114

(58) Field of Classification Search ............... 709/203, 709/311, 312, 313, 315, 316, 331, 332; 719/312–316; 717/114, 116, 118
See application file for complete search history.

(56) References Cited

U.S. PATENT DOCUMENTS

| | | | |
|---|---|---|---|
| 5,870,753 A * | 2/1999 | Chang et al. ........... 707/103 R |
| 6,014,733 A * | 1/2000 | Bennett ................. 711/216 |
| 6,182,107 B1 * | 1/2001 | Atsatt .................. 709/100 |
| 6,438,616 B1 * | 8/2002 | Callsen et al. .......... 709/316 |
| 6,519,652 B1 * | 2/2003 | Sadiq ................... 709/316 |
| 6,584,612 B1 * | 6/2003 | Mueller et al. .......... 717/166 |
| 6,629,154 B1 * | 9/2003 | Jones et al. ............ 709/330 |

* cited by examiner

*Primary Examiner*—William Thomson
*Assistant Examiner*—Diem Cao
(74) *Attorney, Agent, or Firm*—Hickman Palermo Truong & Becker, LLP

(57) ABSTRACT

Techniques are provided for accessing an instance of a recreatable object in a shorter-duration memory based on a reference located in a longer-duration memory, where the shorter-duration memory is associated with a call. One technique involves (1) locating, within the shorter-duration memory, a context structure associated with the call; (2) locating an XREF pointers array based on data cached within the context structure; (3) determining whether the XREF pointers array includes a pointer associated with the reference; and (4) if the XREF pointers array includes a pointer associated with the reference, then following the pointer to locate the instance within the shorter-duration memory. Another technique, which may be employed in addition to or instead of the first technique, involves: (1) when a class is activated, generating, within the shorter-duration memory, a class object associated with the class; (2) storing, within the class object, data for locating instances of recreatable objects associated with the class; (3) to dereference the reference, performing the steps of (a) determining that the reference is associated with the class; and (b) using the data within the class object to locate the instance of the recreatable object.

18 Claims, 5 Drawing Sheets

ACCESSING SHORTER-DURATION INSTANCES OF ACTIVATABLE OBJECTS BASED ON OBJECT REFERENCES STORED IN LONGER-DURATION MEMORY

RELATED APPLICATIONS

The present application claims the benefit of the following U.S. Provisional Patent Application, the contents of which are incorporated by reference in their entirety:

U.S. Provisional Patent Application Ser. No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al..

The present application is related to the following commonly-assigned, U.S. Patent Applications, the contents of all of which are incorporated by reference in their entirety:

.U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al., which issued Sep. 24, 2002 as U.S. Pat. No. 6,457,019

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al., which issued Dec. 24, 2002 as U.S. Pat. No. 6,499,095 B1;

U.S. patent application Ser. No. 09/248,294 entitled ADDRESS CALCULATION OF INVARIANT REFERENCES WITHIN A RUN-TIME ENVIRONMENT, filed on 20 Feb. 11, 1999 by Harlan Sexton et al., which issued Apr. 5, 2005 as U.S. Pat. No. 6,877,161;

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al., which issued Aug. 13, 2002 as U.S. Pat. No. 6,434,685 B1;

U.S. patent application Ser. No. 09/320,578 entitled METHOD AND APPARATUS FOR ACCESSING PAGED OBJECTS USING A FAST DIVISION TECHNIQUE, filed on May 27, 1999 by Harlan Sexton et al., which issued Jun. 4, 2002 as U.S. Pat. No. 6,401,185;

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al., which issued Mar. 23, 2004 as U.S. Pat. No. 6,711,657 B1;

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al., which issued Aug. 5, 2003 as U.S. Pat. No. 6,604,182;

U.S. patent application Ser. No. 09/512,621 entitled SYSTEM AND METHODLOGY FOR SUPPORTING A PLATFORM INDEPENDENT OBJECT FORMAT FOR A RUN-TIME ENVIRONMENT, filed on Feb. 25, 2000 by Harlan Sexton et al.;

U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al., which issued Dec. 7, 2004 as U.S. Pat. No. 6,829,761; and U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al., which issued Feb. 8, 2005 as U.S. Pat. No. 6,854,114.

The present application is related to the following commonly-assigned U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al., which issued May 13, 2005 as U.S. Pat. No. 6,564,223 B1.

The present application is related to the following commonly-assigned co-pending U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al.

FIELD OF THE INVENTION

The present invention relates to handling references to objects and, more specifically, to accessing shorter-duration instances of activatable objects based on object references stored in longer-duration memory.

BACKGROUND OF THE INVENTION

Computer languages that support independent constructed program units must resolve symbolic references from one program unit to an "external" object in another program unit. For example, most C and C++ programming language environments support separate compilation of source code files into object code files. When a first source code file references an object defined in a second source code file, the compiler typically creates an "external reference" to that object in the object code that it generates when it compiles the first source code file. The external reference within the object code is eventually resolved into an actual address.

A number of approaches have been developed for resolving external references. For example, with a "static linking" approach, external references are resolved at link time, i.e. when the separately compiled object code files are combined together to form a complete, executable program. Another approach is "dynamic linking," in which some object code files are grouped into modules typically called "dynamic link libraries" or "DLLs." When a program linked with DLLs is executed, the DLLs are not combined with the program until the program is loaded into memory for execution. In the dynamic linking approach, external references are resolved at load time.

One popular programming language that supports separate compilation is JAVA, a platform-independent, object-oriented language developed by Sun Microsystems. In JAVA, the attributes and methods for a class of objects are typically defined in its own source file, which is separately compiled into an architecture-neutral object file containing bytecodes that are interpreted by the target platform. Since it is common for one class to reference objects that belong to another class, JAVA source files will commonly require external references to other objects and their classes.

Lately, there has been much interest in using JAVA as a development language for applications that interact with a relational database system. A relational database system stores information in tables organized into rows and columns. To retrieve the information, a database application submits queries and other "calls" to a database server process, which determines which information in the tables satisfies the request.

A multi-user database allows multiple users to connect to the database concurrently in many separate sessions, and typically only a few of the sessions are actively using the database at any particular time by making calls. When designing a run-time environment for database applications, scalability in terms of the number of simultaneous users who can establish separate sessions is very important. A significant constraint for user scalability is the size of the memory "footprint" that each session consumes, and it is desirable to reduce the session memory footprint to improve scalability.

JAVA defines the lifetime of many objects, especially system objects, to extend throughout the duration of a session. Some of these objects, however, are infrequently used. Resolving external references to such objects at link time or load time according to conventional approaches entails loading these objects when the run-time environment is executed, either because they are statically part of the executable image or are dynamically loaded from a DLL. These objects consume session memory and reduce the user scalability of the database system.

Since session memory is allocated for each active client session, user scalability is improved by reducing the memory requirements of session memory. Memory requirements for session memory may be reduced by deferring the allocation of external objects in session memory until those external objects are actually accessed. This is referred to as lazy evaluation for resolving external objects. In particular, these external objects (whose allocation in session memory is designated to be deferred until they are accessed) are so designated by creating external references to them, for example by implementers of the run-time environment. In addition, if the external objects are easily "recreatable," the objects can be deallocated and later allocated (or found in a shared memory) through the lazy evaluation process.

One example of an external object whose allocation would be desirable to defer is a class definition for a required, but rarely used system class, such as a system error class. This class typically requires much memory to be allocated for static member variables, for example, for error messages that are output as well as for the byte codes of the error handling instructions. Therefore, allocating a system error class in session memory increases the session memory footprint and thereby reduces the number of users who can establish a session at one time, even though that allocated session memory is rarely used. Accordingly, the allocation of the class definition for such a class is deferred until the class is actually used. Furthermore, even when the class definition is allocated upon access, the class definition can be allocated in non-session memory.

Objects stored in longer-duration memory may themselves include numerous recreatable external references. For example, the code for a particular class may use recreatable external references to identify other classes, such as the superclass of the particular class. In addition, objects in longer-duration memory may use recreatable external references to refer to objects that reside in a constant pool.

A constant pool is an area of memory that holds the data for all of the literal values used in a program's code. Such data may include, for example, text strings and numeric constants. Typically, literals are handled by creating a table of pointers, where each of the pointers points to a literal value. When code that references a literal value is compiled, the literal value is assigned to a global variable, and the code that accesses the literal value does so through a reference to the global variable. To avoid loading a potentially large amount of data associated with such global variables, they may be accessed using recreatable external references. This is also used to maintain semantics if objects from different class files might be equivalent.

In addition to recreatable external references associated with global variable that correspond to literals in a constant pool, longer-duration memory may also contain recreatable external references to other types of objects. For example, longer-duration memory may contain recreatable external references to methods identified in a method table within longer-duration memory. The method table may be accessed, for example, when a method in a particular class makes a call to another method in the same class.

When recreatable external references to objects in shorter-duration memory are used in longer-duration memory, it results in a significant performance penalty because the objects in the longer-duration memory do not contain information specific to any particular call. However, because the recreated objects are realized on a per-call basis, the cached values array resides in the call memory, which is private. Consequently, recreatable external references in longer-duration memory do not contain pointers to the corresponding cached values arrays. However, the cached values array that corresponds to an recreatable external reference must be inspected every time the recreatable external reference is dereferenced in order to determine whether the referenced object has already been realized, and if so, where the realized instance of the object is located. Thus, every time a recreatable external reference in longer-duration memory is dereferenced, relatively expensive measures must be taken to locate the appropriate private cached values array to determine whether the referenced object has already been realized.

Unfortunately, in systems that use lazy evaluation for resolving recreatable external references, the runtime performance penalty for dereferencing such external references may be significant. Based on the foregoing, it is desirable to provide a system that allows lazy evaluation of external references, but reduces the runtime performance penalty.

SUMMARY OF THE INVENTION

Techniques are provided for accessing an instance of a recreatable object in a shorter-duration memory based on a reference located in a longer-duration memory, where the shorter-duration memory is associated with a call. One technique involves (1) locating, within the shorter-duration memory, a context structure associated with the call; (2) locating an cached values array based on data cached within the context structure; (3) determining whether the cached values array includes a pointer associated with the reference; and (4) if the cached values array includes a pointer associated with the reference, then following the pointer to locate the instance within the shorter-duration memory. Another technique, which may be employed in addition to or instead of the first technique, involves: (1) when a class is activated, generating, within the shorter-duration memory, a class object associated with the class; (2) storing, within the class object, data for locating instances of recreatable objects associated with the class; (3) to dereference the reference, performing the steps of (a) determining that the reference is associated with the class; and (b) using the data within the class object to locate the instance of the recreatable object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for dereferencing XREFs that reside in longer-duration memory are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Memory Model

Figure 2:
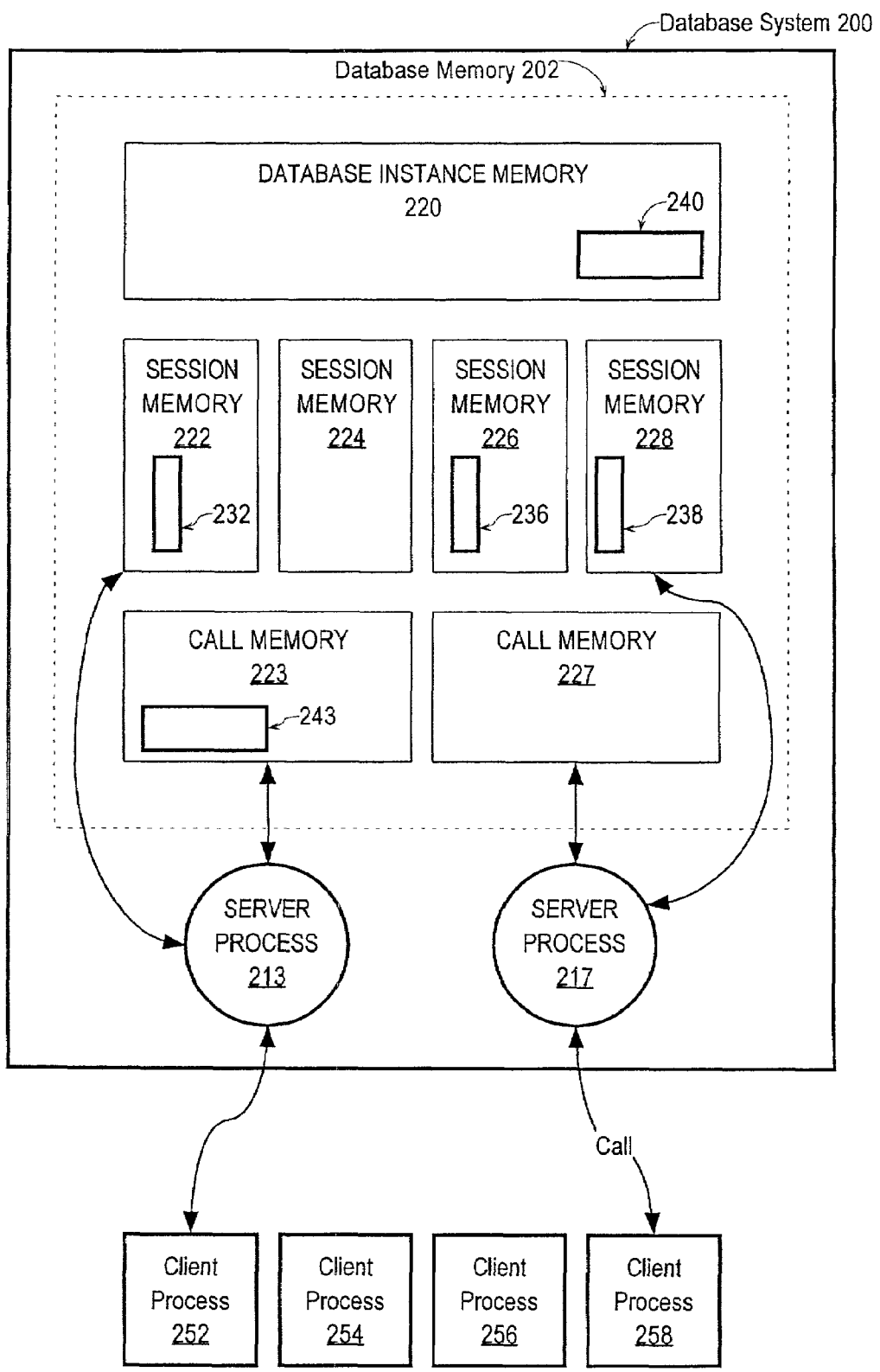
FIG. 2 is a schematic drawing of database server memory model for use with an embodiment.

FIG. 2 schematically illustrates a database system 200 with which a run-time environment for a language such as JAVA is used. In the illustrated configuration, client processes 252, 254, 256, and 258 establish database sessions with the database system 200. A database session refers to the establishment of a connection between a client and a database system through which a series a calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a JAVA object or class, defined for performing a database task for database system 200.

Database system 200 comprises, among other components, a database memory 202 for storing information useful for processing calls and a number of server processes 213 and 217 for handling individual calls. The database memory 202 includes various memory areas used to store data used by server processes 213 and 217. These memory areas include a database instance memory 220, session memories 222, 224, 226, and 228, and call memories 223 and 227. It is to be understood that the number of the session memories and call memories in FIG. 2 is merely illustrative and, in fact, the number of such memories will vary over time as various clients make various calls to the database system 200.

The database instance memory 220 is a shared memory area for storing data that is shared concurrently by more than one process. For example, longer-duration memory area may be used store the read-only data and instructions (e.g. bytecodes of JAVA classes) that are executed by the server processes 213 and 217. The database instance memory 220 is typically allocated and initialized at boot time of the database system 200, before clients connect to the database system 200.

When a database session is created, an area of the database memory 202 is allocated to store information for the database session. As illustrated in FIG. 2, session memories 222, 224, 226, and 228 have been allocated for clients 252, 254, 256, and 258, respectively, for each of which a separate database session has been created. Session memories 222, 224, 226, and 228 are a shared memory used to store static data, i.e., data associated with a user that is preserved for the duration of a series of calls, especially between calls issued by a client during a single database session. JAVA class variables are one example of such static data.

A call memory, such as call memory 227, is used to store data that is bounded by the lifetime of a call. When client 258 submits a call to the database system 200, one of server processes 213 or 217 is assigned to process the call. For the duration of the call, the server process is allocated a call memory for storing data and other information for use in processing the call. For example, server process 217 uses call memory 227 and session memory 228 for processing a call submitted by client process 258. Because the lifetime of objects in a call memory associated with a call is shorter than the lifetime of objects stored in the session memory associated with the session in which the call was made, call memory is said to be a "shorter-duration" memory relative to the session memory. Conversely, session memory is "longer-duration" memory relative to call memory.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handle its various calls. At any given time, the number of calls requiring execution by a server process is typically much fewer than the current number of active clients. Thus, database system 200 is typically configured to execute fewer server processes than the maximum number of active clients.

"Virtual memory" refers to memory addressable by a storage allocation technique in which auxiliary storage, such as storage on a disk drive, can be addressed as though it were part of the main memory of a machine. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory.

"Secondary storage" as used herein refers to storage elements, other than virtual memory, accessible to a process. Secondary storage may be local or networked. Local secondary storage is frequently a random access storage device such as a magnetic or optical disk. Networked secondary storage is provided by storage devices on other computer systems.

External Objects

Figure 3:
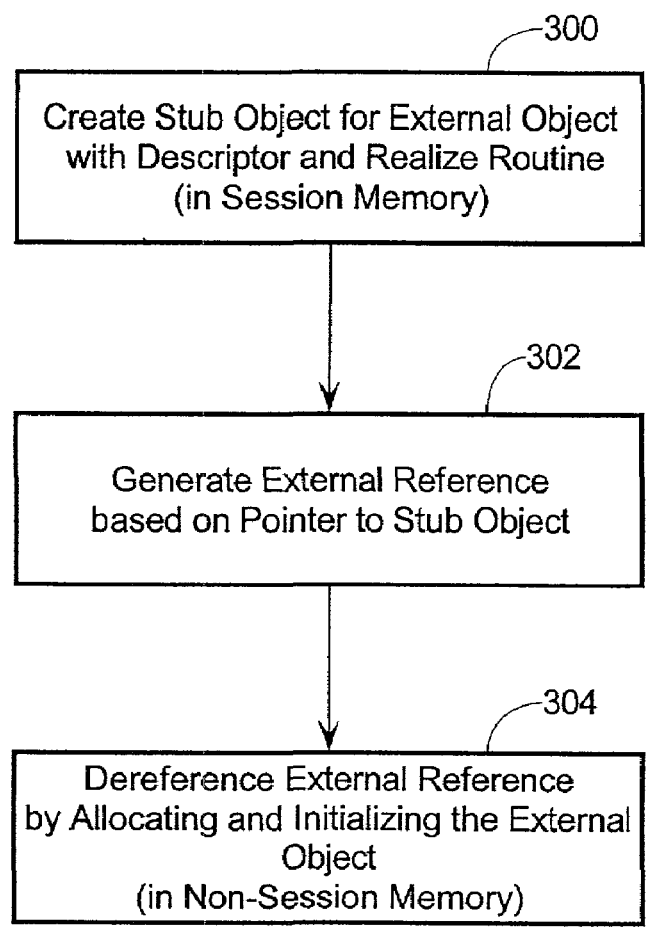
FIG. 3 is a flowchart for resolving recreatable external references.

FIG. 3 depicts a flowchart illustrating the memory management involving the lazy evaluation of external references. At step 300, a stub object for the external object is created in session memory. The stub object includes a "descriptor," which is a group of data that identifies the external object and is sufficient to create or recreate the external object. Typically, the descriptor is a string that names the object or includes directions for loading and initializing the external object, for example, from an identified file in secondary storage. Furthermore, the stub object is associated with a "realize routine," which can be a static member function or a generic function for the stub object's class. The realize routine is responsible for creating or recreating the external object using the information encoded in the descriptor. The implementation of the realize routine and descriptor is dependent on the particular external object and generally is written specifically for that external object or for external objects belonging to a particular class.

The stub object may be marked "activatable", for example by setting an appropriate bit in the object header, to distinguish the stub object from other objects whose loading into session memory is not to be deferred. Thus, an activatable stub object is a proxy for another object that will be recreated upon demand using information stored in the activatable stub object.

Run-Time External References

At step 302 in FIG. 3, when a pointer to the stub object is assigned to a slot in an object, for example during initialization of the object, a run-time external reference (XREF) is generated based on the pointer to the stub object and stored in the slot instead of the pointer to the stub object. A run-time external reference is a reference to an object, such that dereferencing the run-time external reference causes the external object to be loaded into virtual memory, if the object is not currently loaded.

Figure 4:
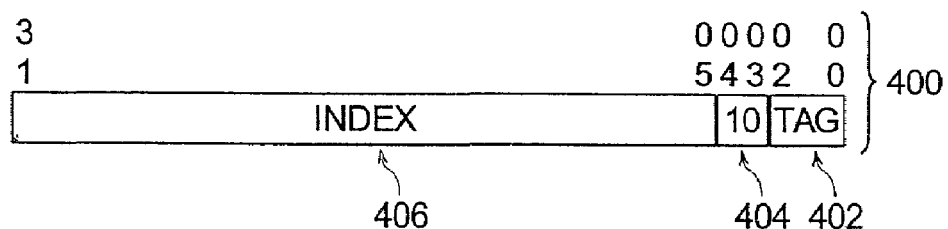
FIG. 4 is a schematic drawing of a layout of an external reference in accordance with an embodiment.

FIG. 4 illustrates a possible layout for a run-time external reference 400. In order for run-time external references to coexist with other types of references, such as machine pointers and numeric references to loaded objects, a run-time external reference preferably includes a tag 402 that indicates that the reference is a run-time external reference. Non-external references may also be tagged, but with a different value to distinguish themselves from run-time external references and to indicate other storage properties of the objects they reference. In implementations that do not employ reference tagging, this information can be stored in the header or body of the object, for example by deriving all external objects from a base class for recreatable objects.

In one implementation of reference tagging, a certain number of bits in a reference, for example the higher-order bits or lower-order bits, is reserved for distinguishing the run-time external references from other references. The information embedded within the reference, which is likely to be sitting in a fast-access machine register, can therefore be retrieved very quickly, without requiring additional memory cycles to fetch the header of the referenced object.

A preferred implementation of reference tagging introduces an alignment invariant and then exploits the alignment invariant in a run-time environment to encode the run-time external reference format in the lower-order bits. Specifically, objects managed by the run-time environment are stored at an N-bit aligned address, or, in other words, the storage for these objects begins at virtual addresses at $2^N$-byte boundaries. For example, if the objects can be stored at three-bit aligned addresses, that is, on $2^3=8$ byte boundaries, a legal start address for such an object might be 0x20446740, but an address such as 0x20446743 is not a valid start address for the storage of an object.

Consequently, the three least significant bits of the reference do not serve to differentiate different objects, since only one of the eight values for the three least significant bits is a legal address and the remaining seven values do not point to any other object. Given this alignment restriction, references that resolve to addresses 0x20446740 through 0x20446747 effectively refer to the same object. Therefore, any of the N least significant bits of a reference to an N-bit aligned object can be used as a tag to encode other information, for example, whether the referenced object is an external object to be loaded upon use.

A three-bit tag in a thirty-bit reference will theoretically allow for $2^{32-3}=2^{29}$, or about half a billion, different run-time external references. Since this number of run-time external references is well in excess of what is needed in most, if not all, run-time environments and since the number of different three-bit tag values is limited (i.e. to eight), the same three-bit tag value for run-time external references is preferably shared with other kinds of external reference. The tag value used by run-time external references may be shared with indexed references. An indexed reference is a type of reference that evaluates to an array entry of one sort or another.

Accordingly, some of the non-tag bits of an indexed reference specify the array and other bits specify an index into the array. In the case of a run-time external reference 400 in FIG. 4, array bits 404 specify the arrays that are used to implement run-time external references, namely a descriptor array and a XREF pointers array, which functions as a cahced values array. The remaining, index bits 406 specify the common index into the descriptor array and the XREF pointers array. In one embodiment, the descriptor array is allocated in session memory, e.g. as descriptor arrays 232, 236, and 238 in sessions memories 222, 226, and 228, respectively, while the XREF pointers array can be allocated in non-session memory, for example, XREF pointers array 243 in call memory 223 or XREF pointers array 240 in database instance memory 220.

Creating Run-Time External References

Figure 5:
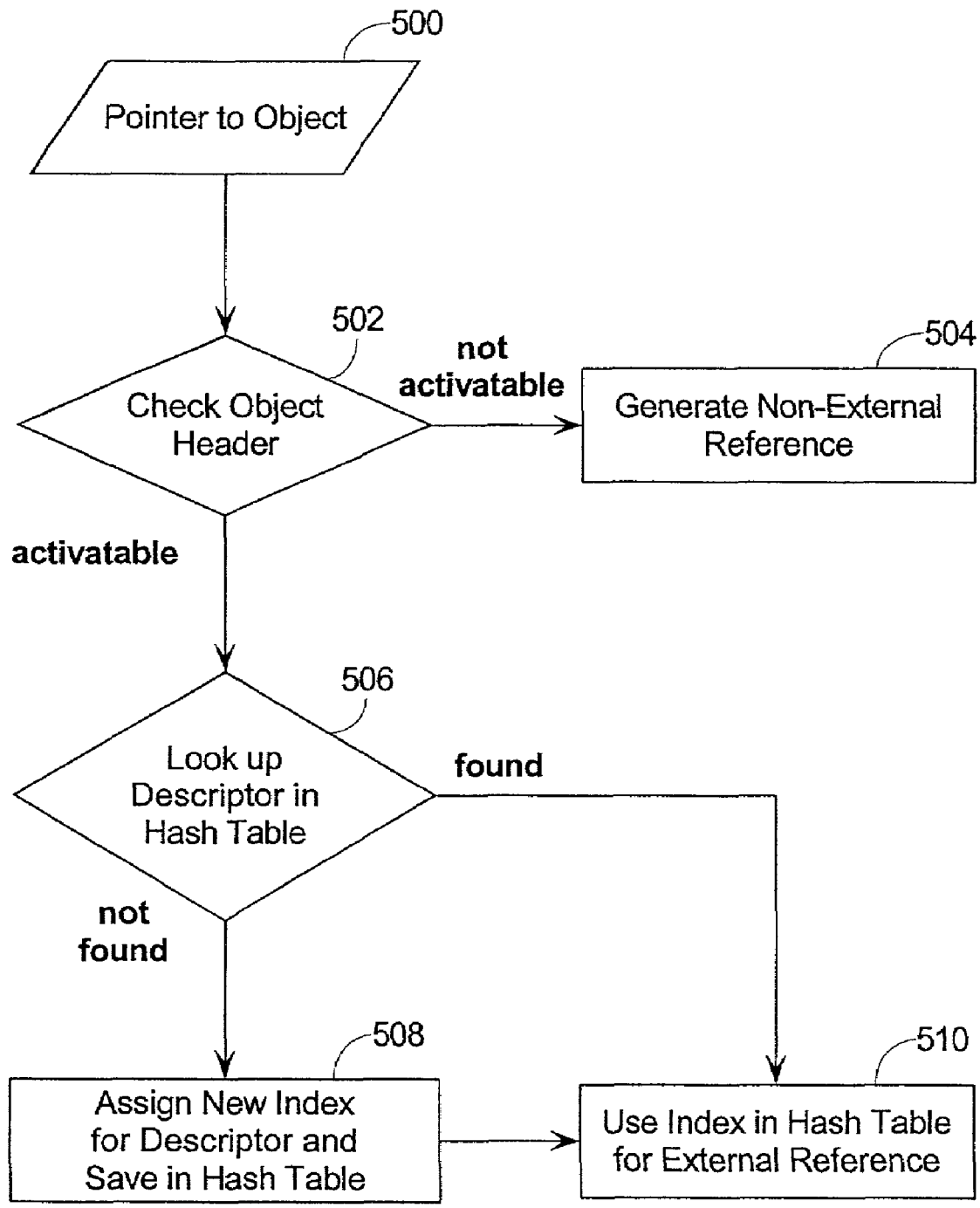
FIG. 5 is a flowchart for generating an external reference from a pointer to a stub object.

FIG. 5 is a flowchart illustrating steps taken in creating a run-time external reference for an external object based on a pointer to a stub object for the external object in accordance with an embodiment. At a step 500, a pointer to stub object is obtained for assignment in a slot of an object within the run-time environment. Typically, this pointer value is obtained from a variable passed into a function, returned from a function or memory allocation operator, loaded from a memory address not part of the program state, or produced by dereferencing a reference to the stub object.

During the assignment procedure in step 502, the pointer is dereferenced at a zero or negative offset to check a bit in the header of the object for determining whether the dereferenced object is "activatable." An activatable object is an object that can be allocated and initialized upon dereference. If the object is not activatable, then the non-external reference is generated as appropriate for the run-time environment (step 504). For example, if the run-time environment uses tagged machine pointers to reference objects, then an appropriate tagged machine pointer is generated. As another example, if the run-time environment uses tagged numeric references to reference objects in session memory, then an appropriate numeric reference is generated. This reference is stored in the slot of the object.

If, on the other hand, the object is activatable, the referenced object is a stub object and therefore contains a descriptor for activating the object or, in some embodiments, a pointer to the descriptor. Since multiple external references may be generated for the same external object, the descriptor, which uniquely identifies the external object, is used to perform a look up in a data structure, such as a hash table, to determine whether the external object was already referenced (step 506). If a hash table entry corresponding to the descriptor is not found in the hash table, then the descriptor has not yet been assigned an index value. Consequently, a new index value is assigned for the descriptor (and therefore for the external object), and the index value stored in the appropriate hash table entry of hash table (step 508). Any one of a number of well-known collision handling techniques may be used to address the situation in which more than one descriptor hashes to the same hash table entry.

On the other hand, if an index entry associated with the descriptor is found in the hash table, then the previously assigned index value for the descriptor (and therefore the external object) is obtained from the hash table. At step 510, the obtained index value, whether newly assigned or fetched from the hash table, is stored in the in the index portion 406 of the run-time external reference 400.

After the run-time external reference has been generated during an assignment operation, the run-time external reference is stored in the slot of an object, just like any other reference in the run-time environment is stored in the slot.

Creating and Recreating Activatable Objects

Referring again to FIG. 3, a run-time external reference is dormant until the run-time external reference is dereferenced during operation of the run-time environment. Dereferencing a run-time external reference refers to resolving the reference into a machine pointer and accessing the memory at an address indicated by the machine pointer. When the run-time external reference is dereferenced during operation of the run-time environment, the memory for the external object referenced by the run-time external reference may be allocated and initialized, frequently in non-session memory (step 304). The external reference is often to shared memory, for example, to a shared part of a Java class.

Figure 6:
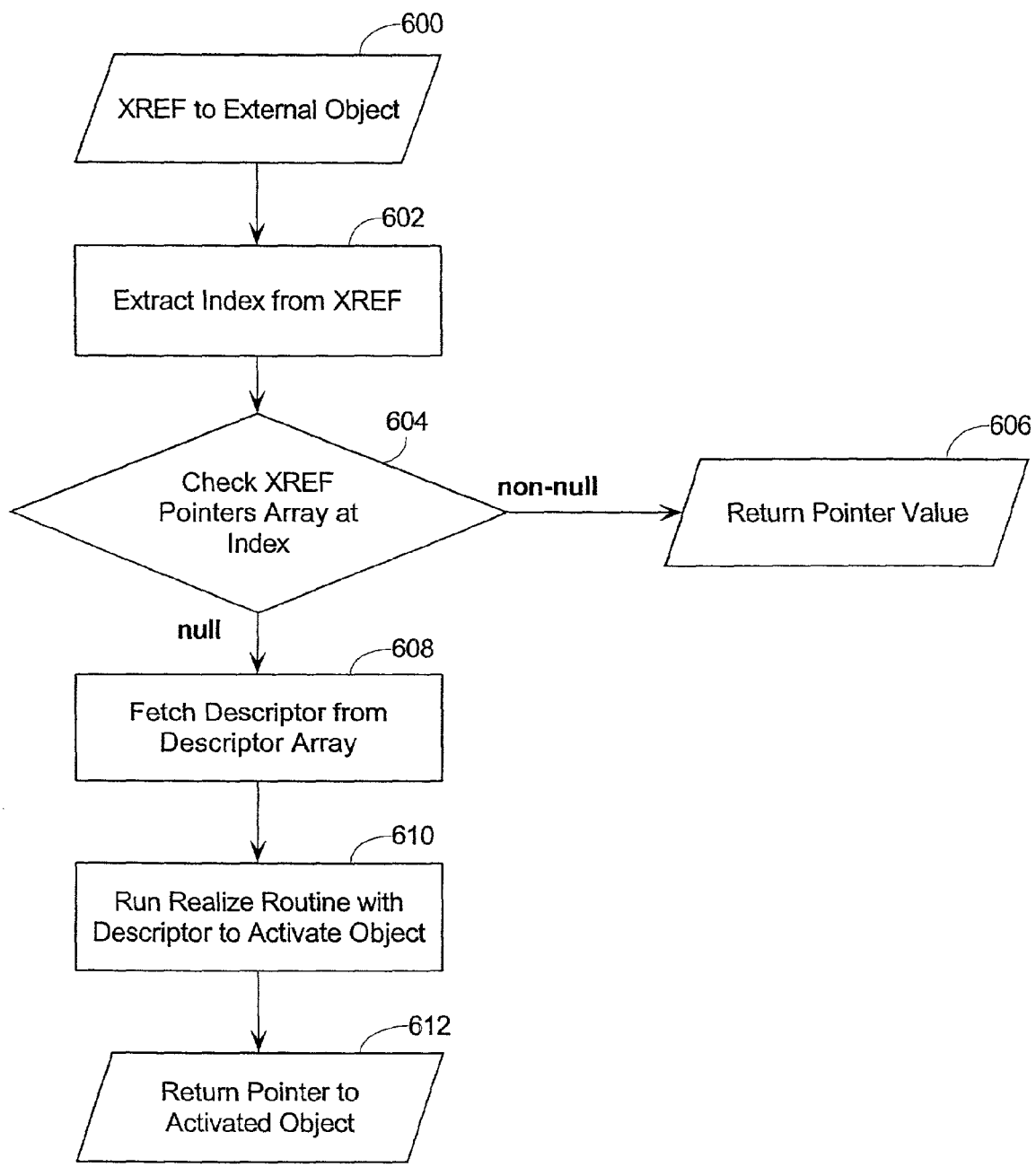
FIG. 6 is flowchart for dereferencing an external reference.

FIG. 6 is a flowchart illustrating steps taken in resolving a run-time external reference into a machine pointer to a loaded, external reference. At step 600, a run-time external reference is obtained, typically by reading the run-time external reference from a slot in an object at a given memory address. Assuming the tag value of the reference indicates that the reference is indeed a run-time external reference, the index portion 406 of the run-time external reference 400 is extracted (step 602).

At step 604, the XREF pointers array, e.g. XREF pointers array 243 for client process 252, is checked at the array location that corresponds to the extracted index. The XREF pointers array 243 stores references to previously loaded or otherwise resolved external objects. If an external object is not resolved, then the corresponding reference in the XREF pointers array 243 is null. Therefore, if the reference in the XREF pointers array 243 is not-null, then the external object referenced by the run-time external reference is currently loaded. Under those circumstances, the reference in the XREF pointers array 243 is resolved into a machine pointer value and returned (step 606).

If, on the other hand, a null reference was found in the XREF pointers array 243, then the external object needs to be activated. Accordingly, the descriptor for the external object is fetched from the descriptor array entry located at same index location in the parallel descriptor array 232 (step 608). The descriptor array 232 entry for this index was previously set when the run-time external reference was originally assigned. The realize routine, associated with the stub object, such as a member function or a generic function, is executed, using the fetched descriptor value (step 610).

Running the realize routine causes memory for the object to be found or allocated and initialized. The implementation of the realize routine will vary from object to object, but the present invention is not limited to any particular implementation of the realize routine. For example, the realize routine may activate the external object by loading data in a file from secondary storage into a data structure for the array or by pointing to a shared object 230 in database instance memory 220 that was identified by hashing the descriptor.

Since resolving an external object referenced by a run-time external object is deferred until the run-time external reference is dereferenced, it is not necessary to allocate memory, until the external object is actually used, thereby reducing the memory footprint and increasing scalability. Even when the external object is finally loaded, the bulk of the external object is allocated and recreated as-needed in a non-session memory, such as call memory or database instance memory, which is another way of reducing the session memory footprint and increasing scalability. Thus, use of run-time external references implements a systematic, lazy evaluation for external references.

Objects stored in longer-duration memory may themselves include numerous recreatable external references. For example, the code for a particular class may use recreatable external references to identify other classes, such as the superclass of the particular class. In addition, objects in longer-duration memory may use recreatable external references to refer to objects that reside in a constant pool.

A constant pool is an area of memory that holds the data for all of the literal values used in a program's code. Such data may include, for example, text strings and numeric constants. Typically, literals are handled by creating a table of pointers, where each of the pointers points to a literal value. When code that references a literal value is compiled, the literal value is assigned to a global variable, and the code that accesses the literal value does so through a reference to the global variable. To avoid loading a potentially large amount of data associated with such global variables, they may be accessed using recreatable external references. This is also used to maintain semantics if objects from different class files might be equivalent.

In addition to XREFs associated with global variable that correspond to literals in a constant pool, longer-duration memory may also contain XREFs to other types of objects. For example, longer-duration memory may contain XREFs to methods identified in a method table within longer-duration memory. The method table may be accessed, for example, when a method in a particular class makes a call to another method in the same class.

When XREFs to objects in shorter-duration memory are used in longer-duration memory, it results in a significant performance penalty because the objects in the longer-duration memory do not contain information specific to any particular call. However, because the recreated objects are realized on a per-call basis, the XREF pointers array 243 resides in the call memory 223, which is private. Consequently, XREFs in longer-duration memory do not contain pointers to the corresponding XREF pointers arrays. However, the XREF pointers array that corresponds to an XREF must be inspected every time the XREF is dereferenced in order to determine whether the referenced object has already been realized, and if so, where the realized instance of the object is located. Thus, every time an XREF in longer-duration memory is dereferenced, relatively expensive measures must be taken to locate the appropriate private XREF pointers array to determine whether the referenced object has already been realized.

Unfortunately, in systems that use lazy evaluation for resolving recreatable external references, the runtime performance penalty for dereferencing such external references may be significant. Based on the foregoing, it is desirable to provide a system that allows lazy evaluation of external references, but reduces the runtime performance penalty.

Locating the XREF Pointers Array Using a Hash Table

As described above, the XREF pointers array 243 includes pointers to the realization of the activatable objects. Because the recreated objects are realized on a per-call basis, the XREF pointers array 243 resides in the call memory 223. At the end of a call, the activatable objects are deallocated, as is the XREF pointers array 243 and all other structures within the call memory 223 associated with the call.

The appropriate XREF pointers array 243 must be consulted when an XREF is dereferenced in order to determine whether the corresponding object has been activated, and if so, where the activated instance of the object resides (step 604 in FIG. 6). When the XREF resides in longer-duration memory and the corresponding object resides in shorter-duration memory, a pointer to the appropriate XREF pointers array will not reside with the XREF in longer-duration memory. According to one embodiment, the longer-duration memory is paged, and the XREF pointers array that is associated with a particular page of longer-duration memory is located using a hash table constructed in the call memory.

Specifically, a hash table that maps shared-memory pages with XREF pointers arrays is constructed in call memory. The hash code used to hash into the hash table is generated from the address of the corresponding shared-memory page. According to one embodiment, a hash code is generated for each shared-memory page by performing a cyclical redundancy check on the address of the shared-memory page. To avoid recalculating the hash code every time that it is needed, the hash code is preferably calculated once, and then stored at a known location within the shared-memory page to which it corresponds. Thus, given the address of any object in the shared-memory page, the hash code can be quickly determined by performing a mask operation on the address to locate the start of the page, and adding to the page address an offset that produces the address of the hash code stored within the page.

Once the hash code of the page is located, the hash code (or some subset thereof) is used as the hash index into the hash table. A function call is then made to locate a hash table entry corresponding to the hash index. If the hash table contains no entry for the page, then an XREF pointers array has not yet been constructed for the shared-memory page. Under those conditions, (1) an XREF pointers array is constructed, (2) a hash table entry that associates the hash index with the new XREF pointers array is added to the hash table, (3) the object associated with the XREF is activated based on the corresponding descriptor array entry, and (4) an entry is added to the new XREF pointers array to point to the newly activated object.

If the hash table contains an entry, then the XREF pointers array associated with the entry is located based on a pointer within the hash table entry. The XREF pointers array is searched to determine whether the object associated with the XREF has been activated. If the object associated with the XREF has not been activated, then (1) the object associated with the XREF is activated based on the corresponding descriptor array entry, and (2) an entry is added to the new XREF pointers array to point to the newly activated object.

If the object associated with the XREF has already been activated, then a pointer in the appropriate entry of the XREF pointers array is used to locate the activated instance of the object.

Locating the XREF Pointers Array Using Pointers Cached in the Context

While the technique described above allows the XREF pointers array that is associated with a shared-memory page to be located, executing the function call to perform the hash lookup for every dereferencing operation imposes significant overhead. According to one embodiment, pointers to XREF pointers arrays are cached in a context structure, where the context structure is passed as an argument when a call is made.

Specifically, when a call is made, an array is allocated in the context structure that is passed as a parameter to the call. Initially, the array will not contain any populated entries. When an XREF is encountered on a shared-memory page, the hash code of the page is located and the hash code (or some subset thereof), is extracted. However, rather than making a function call to locate a hash table entry, the portion of the hash code is used as an index into the array within the context structure. According to one embodiment, the size of the array is $2^N$, and the number of bits of the hash code that are used to index into the array is N. Thus, every possible index value will have a corresponding a slot within the array.

If the array contains no entry at the indexed location, then an XREF pointers array has not yet been constructed for the shared-memory page during that call. Under those conditions, (1) an XREF pointers array is constructed, (2) an array entry that points to the new XREF pointers array is added to the array, (3) the object associated with the XREF is activated based on the corresponding descriptor array entry, and (4) an entry is added to the new XREF pointers array to point to the newly activated object.

If the array contains an entry at the indexed location, then it is determined whether the entry is for the correct shared-memory page. This step is performed because the array may be relatively small, and collisions may occur (i.e. different shared-memory pages may map to the same index value). According to one embodiment, the key of a shared-memory page is stored within the entry for the shared memory page. Collisions may be identified by comparing the key stored in an entry with the key of the shared-memory page that is the subject of the search. In the case of a collision, any one of a number of well-known collision handling techniques may be employed. The present invention is not limited to any particular collision handling technique. In general, upon identifying a collision, a search for the correct entry will continue until either the correct entry is found, or it is determined that the array does not contain an entry for the correct shared-memory page. If the array does not contain an entry for the correct shared-memory page, then the process described above is followed.

If a correct entry is identified, then the XREF pointers array associated with the entry is located based on a pointer within the array entry. The XREF pointers array is searched to determine whether the object associated with the XREF has been activated. If the object associated with the XREF has not been activated, then (1) the object associated with the XREF is activated based on the corresponding descriptor array entry, and (2) an entry is added to the new XREF pointers array to point to the newly activated object.

If the object associated with the XREF has already been activated, then a pointer in the appropriate entry of the XREF pointers array is used to located the activated instance of the object.

Accessing the array in the context structure is much cheaper than using the hash table because accessing the hash table requires a function call, while indexing into the array does not involve making a function call and does not incur the overhead associated with maintaining a hash table (e.g. collision-handling).

Locating the XREF Pointers Array Using Pointers Cached in Private Class Objects

For reference patterns where the number of shared-memory pages being accessed is small and stable, using a shared-memory-page-to-XREF-pointers-array array within the context structure of a call works satisfactorily. However, another type of cache yields superior results when the XREFs are to constant pool variable values.

Specifically, the code referencing the constant pool maintains a "session-private" version of each class (referred to herein as a "jom_active_class object") in addition to the shared version of that class (referred to herein as the "jom_class"). According to one embodiment, the session-private recreatable external reference state for an object memory is stored in the jom_active_class for that object memory. Because there is only one class in each shared object memory that holds class information, the association between classes and the object memories that contain them is 1—1. Thus, when an XREF encountered in an object memory stored in longer-duration memory is a reference to a constant pool item, the jom_active_class object associated with the class in that object memory is inspected.

If the jom_active_class object contains no pointer to an XREF pointers array, then an XREF pointers array has not yet been constructed for the corresponding jom_class during that call. Under those conditions, (1) an XREF pointers array is constructed, (2) a pointer that points to the new XREF pointers array is added to the jom_active_class object, (3) the object associated with the XREF is activated based on the corresponding descriptor array entry, and (4) an entry is added to the new XREF pointers array to point to the newly activated object.

If the jom_active_class object contains a pointer to the XREF pointers array, then the XREF pointers array associated with the class is located based on the pointer. The XREF pointers array is searched to determine whether the object associated with the XREF has been activated. If the object associated with the XREF has not been activated, then (1) the object associated with the XREF is activated based on the corresponding descriptor array entry, and (2) an entry is added to the new XREF pointers array to point to the newly activated object.

If the object associated with the XREF has already been activated, then a pointer in the appropriate entry of the XREF pointers array is used to located the activated instance of the object.

In an alternative embodiment, the XREF pointers array for a class is automatically built in call memory at the time that the class is activated. Thus, even the first dereferencing operation will encounter a pointer, within the jom_active_class object, to an XREF pointers array.

Hardware Overview

Figure 1:
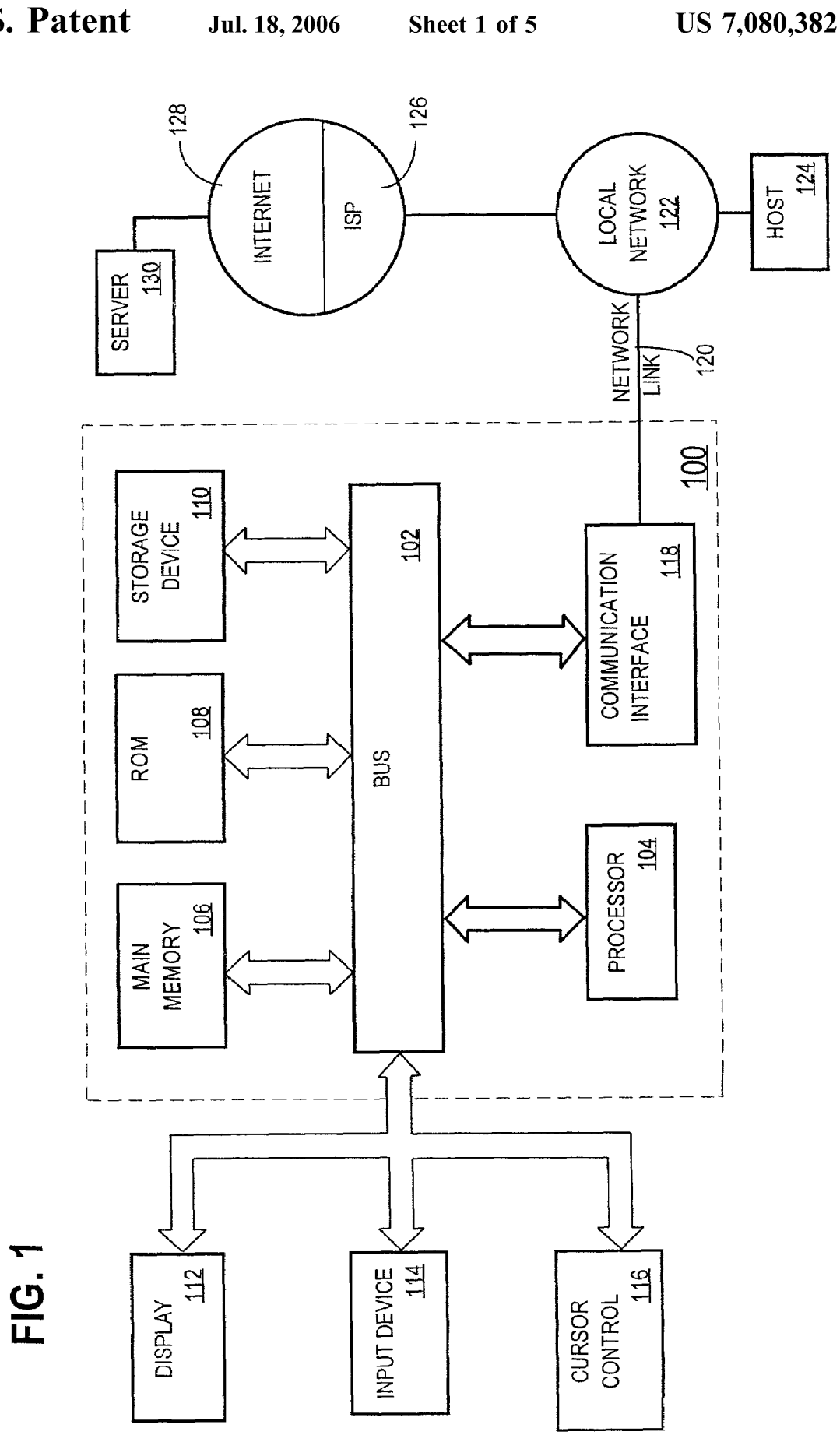
FIG. 1 is a block diagram of a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are implemented by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application implements the techniques described herein.

The received code may be executed by processor 104 as it is received, and/or stored in storage device 110, or other non-volatile storage for later execution. In this manner, computer system 100 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for accessing an instance of a recreatable object in a shorter-duration memory based on a reference to the instance of the recreatable object located in a longer-duration memory, wherein the shorter-duration memory is associated with a call, the method comprising the steps of:

locating, within the shorter-duration memory, a context structure, wherein at least a portion of the context structure is passed as an argument to the call;

locating an XREF pointers array based on data cached within the context structure, wherein the data cached within the context structure includes a reference to the XREF pointers array;

determining whether the XREF pointers array includes a pointer associated with said reference to the instance of the recreatable object; and if the XREF pointers array includes a pointer associated with said reference to the instance of the recreatable object, then following said pointer to locate said instance within said shorter-duration memory.

2. The method of claim 1 wherein the step of locating an XREF pointers array based on data cached within the context structure comprises the steps of:

determining a hash code associated with a memory page in which the reference to the instance of the recreatable object located in the longer-duration memory is located;

using at least a portion of the hash code as an index to locate an array entry within an array stored within the context structure; and if said array entry contains a pointer, then following said pointer stored in said array entry to locate said XREF pointers array.

3. The method of claim 2 wherein:

the array is a power-of-two array; and the portion of said hash code that is used as said index includes a particular number of bits of said hash code.

4. The method of claim 2 wherein, if said array entry does not contain a pointer:

creating said instance of the recreatable object by activating said recreatable object; and storing a pointer to said instance of the recreatable object in said array entry.

5. The method of claim 1 wherein, the XREF pointers array does not include a pointer associated with said reference to the instance of the recreatable object, the computer-implemented method further comprising the steps of:

creating said instance of the recreatable object by activating said recreatable object; and storing a pointer to said instance of the recreatable object in said XREF pointers array.

6. The method of claim 1 wherein the duration of the shorter-duration memory is shorter than the duration of the longer-duration memory.

7. A computer implemented method for accessing an instance of a recreatable object in shorter-duration memory based on a reference located in a longer-duration memory, wherein the shorter-duration memory is associated with a call, the method comprising the steps of:

when a class is activated, generating, within said shorter-duration memory, a class object associated with the class;

storing, within said class object, data for locating instances of recreatable objects associated with said class, wherein said data includes a pointer to an XREF pointers array;

to dereference said reference located in a longer-duration memory, performing the steps of:

determining that said reference located in a longer-duration memory is associated with said class; and using said data within said class object to locate said instance of said recreatable object.

8. The method of claim 7 wherein the step of using said data within object to locate said instance includes the steps of:

determining whether the XREF pointers array includes a pointer associated with said reference; and if the XREF pointers array includes a pointer associated with said reference, then following said pointer to locate said instance within said shorter-duration memory.

9. The method of claim 8 wherein:

the XREF pointers array does not include a pointer associated with said reference; and the method further comprises the steps of creating said instance by activating said recreatable object; and storing a pointer to said instance in said XREF pointers array.

10. A computer-readable storage medium stores instructions for accessing an instance of a recreatable object in a shorter-duration memory based on a reference to the instance of the recreatable object located in a longer-duration memory, wherein the shorter-duration memory is associated with a call, the computer-readable medium comprising instructions for performing the steps of:

locating, within the shorter-duration memory, a context structure, wherein at least a portion of the context structure is passed as an argument to the call;

locating an XREF pointers array based on data cached within the context structure, wherein the data cached within the context structure includes a reference to the XREF pointers array;

determining whether the XREF pointers array includes a pointer associated with said reference to the instance of the recreatable object; and if the XREF pointers array includes a pointer associated with said reference to the instance of the recreatable object, then following said pointer to locate said instance within said shorter-duration memory.

11. The computer-readable medium of claim 10 wherein the step of locating an XREF pointers array based on data cached within the context structure comprises the steps of:

determining a hash code associated with a memory page in which the reference to the instance of the recreatable object located in the longer-duration memory is located;

using at least a portion of the hash code as an index to locate an array entry within an array stored within the context structure; and if said array entry contains a pointer, then following said pointer stored in said array entry to locate said XREF pointers array.

12. The computer-readable medium of claim 11 wherein:

the array is a power-of-two array; and the portion of said hash code that is used as said index includes a particular number of bits of said hash code.

13. The computer-readable medium of claim 11 further comprising instructions for performing the steps of:

if said array entry does not contain a pointer, then creating said instance of the recreatable object by activating said recreatable object; and storing a pointer to said instance of the recreatable object in said array entry.

14. The computer-readable medium of claim 10 wherein if the XREF pointers array does not include a pointer associated with said reference to the instance of the recreatable object, the computer-readable medium further comprises instructions for performing the steps of:

creating said instance of the recreatable object by activating said recreatable object; and storing a pointer to said instance of the recreatable object in said XREF pointers array.

15. The computer-readable medium of claim 10 wherein the duration of the shorter-duration memory is shorter than the duration of the longer-duration memory.

16. A computer-readable storage medium stores instructions for accessing an instance of a recreatable object in shorter-duration memory based on a reference located in a longer-duration memory, wherein the shorter-duration memory is associated with a call, the computer-readable medium comprising instructions for performing the steps of:

when a class is activated, generating, within said shorter-duration memory, a class object associated with the class;

storing, within said class object, data for locating instances of recreatable objects associated with said class, wherein said data includes a pointer to an XREF pointers array;

to dereference said reference located in the longer-duration memory, performing the steps of:

determining that said reference located in the longer-duration memory is associated with said class; and using said data within said class object to locate said instance of said recreatable object.

17. The computer-readable medium of claim 16 wherein the step of using said data within object to locate said instance includes the steps of:

determining whether the XREF pointers array includes a pointer associated with said reference; and if the XREF pointers array includes a pointer associated with said reference, then following said pointer to locate said instance within said shorter-duration memory.

18. The computer-readable medium of claim 17 wherein:

the XREF pointers array does not include a pointer associated with said reference; and the computer-readable medium further comprises instructions for performing the steps of:

creating said instance by activating said recreatable object; and storing a pointer to said instance in said XREF pointers array.

* * * * *